United States Patent [19]

Takahashi et al.

[11] Patent Number: 5,371,146
[45] Date of Patent: Dec. 6, 1994

[54] ETHYLENE COPOLYMER COMPOSITION

[75] Inventors: Mamoru Takahashi; Akira Todo; Shin-ya Matsunaga; Toshiyuki Tsutsui, all of Waki, Japan

[73] Assignee: Mitsui Petrochemical Industries, Ltd., Tokyo, Japan

[21] Appl. No.: 115,661

[22] Filed: Sep. 3, 1993

[30] Foreign Application Priority Data

Sep. 8, 1992 [JP] Japan ................... 4-239277
Mar. 26, 1993 [JP] Japan ................... 5-068848

[51] Int. Cl.$^5$ .............................................. C08L 23/06
[52] U.S. Cl. ................................... 525/240; 525/236
[58] Field of Search .............................. 525/240, 236

[56] References Cited

U.S. PATENT DOCUMENTS

| | | | |
|---|---|---|---|
| 3,231,636 | 1/1966 | Snyder | 525/240 |
| 4,793,956 | 12/1988 | Nogiwa | 264/41 |
| 4,801,652 | 1/1989 | Mizutani | 525/240 |
| 4,804,714 | 2/1989 | Olivo | 525/240 |

FOREIGN PATENT DOCUMENTS

| | | |
|---|---|---|
| 0447035 | 2/1991 | European Pat. Off. . |
| 0492656 | 12/1991 | European Pat. Off. . |
| 0022946 | 2/1984 | Japan . |

*Primary Examiner*—James J. Seidleck
*Assistant Examiner*—I. Zemel
*Attorney, Agent, or Firm*—Sherman and Shalloway

[57] ABSTRACT

Disclosed is an ethylene copolymer composition having a density of 0.980 to 0.955 g/cm$^3$ and a melt flow rate (MFR) of 0.1 to 100 g/10 min., which is formed from two kinds of ethylene/α-olefin copolymers having specific properties and having density and MFR different from each other. The ethylene copolymer composition of the invention is excellent in melt tension and flow index within the high-shear-region, and able to form films of high transparency, high mechanical strength and blocking resistance.

4 Claims, No Drawings

ETHYLENE COPOLYMER COMPOSITION

FIELD OF THE INVENTION

The present invention relates to an ethylene copolymer composition, more particularly to an ethylene copolymer composition which shows higher heat stability and moldability as compared with conventional ethylene copolymers or ethylene copolymer compositions and from which a film of high transparency, high mechanical strength and high blocking resistance can be formed.

BACKGROUND OF THE INVENTION

Ethylene copolymers have heretofore been molded by various molding methods, and used in many fields. The requirement for the characteristics of the ethylene copolymers differs depending on the molding methods and uses. For example, when an inflation film is molded at a high speed, it is necessary to select an ethylene copolymer having a high melt tension compared with its molecular weight in order to stably conduct high speed molding without fluctuation or tearing of bubbles. An ethylene copolymer is required to have similar characteristics in order to prevent sag or tearing in blow molding, or to suppress width shortage to the minimum range in T-die molding.

Further, in extrusion molding, it is important to have small stress under high shearing during extrusion in order to improve quality of molded article and reduce electric power consumption at molding.

By the way, Japanese Patent L-O-P Nos. 90810/1981 and 106806/1985 propose a method for improving moldability by improving the melt tension and blow ratio (die/swell ratio) of ethylene polymers obtained by using Ziegler type catalysts, especially a titanium type catalyst.

The ethylene polymers obtained by using a titanium catalyst, however, especially the low density ethylene polymers generally have problems such as their broad composition distribution and stickiness of their molded articles such as films.

Of the ethylene polymers prepared by using the Ziegler type catalysts, those obtained by using chromium type catalysts are relatively excellent in melt tension but have a defect of poor heat stability. This is thought to be caused by that the chain terminals of the ethylene polymers prepared by using the chromium type catalysts tend to become unsaturated bonds.

It is known that the ethylene polymers obtained by using a metallocene catalyst from among the Ziegler type catalysts have merits such as a narrow composition distribution and a low stickiness of their molded articles such as films. However, it is described in, for example Japanese Patent L-O-P. No. 35007/1985, that an ethylene polymer obtained by using a zirconocene compound formed from a cyclopentadienyl derivative contains one terminal unsaturated bond per molecule, and hence this ethylene polymer is presumably poor in heat stability similarly to the above-mentioned ethylene polymer obtained by using the chromium type catalyst. Further, because of its narrow composition distribution, this ethylene polymer might show poor flowability during the extrusion molding.

Accordingly, the advent of ethylene polymers having a small stress under the high-shear region, a good heat stability, a high mechanical strength and a narrow composition distribution will be of great industrial value.

The present researchers have earnestly studied in the light of the circumstances as described above. As a result, they have found that the ethylene/α-olefin copolymer obtained by copolymerizing ethylene with an α-olefin of 3 to 20 carbon atoms in the presence of a specific catalyst for olefin polymerization comprising (a) a compound of a transition metal in Group IVB of the periodic table which has a bidentate ligand formed by bonding two groups selected from specific indenyl or substituted indenyl groups through a lower alkylene group, or a compound of a transition metal in Group IVB of the periodic table which has a ligand having specific cyclopentadienyl skeleton, and (b) an organoaluminum oxy-compound is excellent in melt tension and heat stability and has a narrow composition distribution. However, the ethylene/α-olefin copolymer as mentioned above is not always well-balanced between the melt tension and the flowability, so that a problem sometimes occurs when the copolymer is subjected to extrusion molding to form a film.

The present inventors have further studied and found that the ethylene copolymer composition comprising two kinds of ethylene/α-olefin copolymer different in both a density and an MFR from each other which are obtained by using the above-mentioned catalyst is excellent in heat stability, melt tension and flowability (FI) under the high-shear region, and films obtained from these compositions are excellent in transparency, mechanical strength and blocking resistance.

OBJECT OF THE INVENTION

It is an object of the present invention to provide ethylene copolymer compositions which are excellent in heat stability and melt tension and from which films of high transparency, high mechanical strength and high blocking resistance can be obtained.

SUMMARY OF THE INVENTION

The ethylene copolymer composition according to the present invention comprises: [A] an ethylene/α-olefin copolymer in an amount of 5 to 95% by weight which is (A-i) a copolymer of ethylene with an α-olefin of 3 to 20 carbon atoms having such properties that (A-ii) the density (d) is in the range of 0.880 to 0.940 g/cm$^3$, (A-iii) the intrinsic viscosity [$\eta_A$] as measured in decahydronaphthalene at 135° C. is in the range of 1.0 to 10.0 dl/g, (A-iv) the temperature (Tin (° C.)) at which the endothermic curve of said copolymer measured by a differential scanning calorimeter (DSC) shows the maximum peak and the density (d) satisfy the relation $$Tm < 400 \times d - 250,$$

(A-v) the melt tension (MT (g)) at 190° C. and the melt flow rate (MFR) satisfy the relation $$MT > 2.2 \times MFR^{-0.84},$$

(A-vi) the flow index (FI (1/sec)) defined by a shear rate which is given when a shear stress of molten copolymer at 190° C. reaches $2.4 \times 10^6$ dyne/cm$^2$ and the melt flow rate (MFR) satisfy the relation $FI > 75 \times MFR$, and (A-vii) the amount (W (% by weight)) of a decane-soluble portion at room temperature and the density (d) satisfy the relation $$W < 80 \times exp(-100 (d-0.88)) + 0.1, \text{ and}$$

[B] an ethylene/α-olefin copolymer in an amount of 5 to 95% by weight which is (B-i) a copolymer of ethylene with an α-olefin of 3 to 20 carbon atoms having such properties that (B-ii) the density (d) is in the range of 0.910 to 0.960 g/cm³, (B-iii) the intrinsic viscosity [$\eta_B$] as measured in decahydronaphthalene at 135° C. is in the range of 0.5 to 2.0 dl/g, (B-iv) the temperature Tm (° C.)) at which the endothermic curve of said copolymer measured by a differential scanning calorimeter (DSC) shows the maximum peak and the density (d) satisfy the relation $$Tm < 400 \times d - 250, \text{ and}$$

(B-v) the amount (W (% by weight)) of a decane-soluble portion at room temperature and the density (d) satisfy the relation, in the case of MFR < 10 g/10 min, $$W < 80 \times exp(-100 (d-0.88)) + 0.1$$

in the case of MFR > 10 g/10 min, $$W < 80 \times (MFR-9)^{0.26} \times exp(-100(d-0.88)) + 0.1,$$

Said ethylene/α-olefin copolymer composition has such properties that (i) the density ratio ([A]/[B]) of the density of said ethylene/α-olefin copolymer [A] to the density of said ethylene/α-olefin copolymer [B] is less than 1, (ii) the intrinsic viscosity ratio ([$\eta_A$]/[$\eta_B$]) of the intrinsic viscosity of said ethylene/α-olefin copolymer [A] to the intrinsic viscosity of said ethylene/α-olefin copolymer [B] is not less than 1, (iii) the density of said composition is in the range of 0.890 to 0.955 g/cm³, and (iv) the melt flow rate (MFR) of said composition at 190° C. under a load of 2.16 kg is in the range of of 0.1 to 100 g/10 min.

The ethylene copolymer composition according to the present invention is excellent in heat stability and moldability, and films obtained from these compositions are excellent in transparency, mechanical strength and blocking resistance.

DETAILED DESCRIPTION OF THE INVENTION

The ethylene copolymer composition according to the present invention is described in detail hereinafter.

The ethylene copolymer composition according to the present invention is formed from an ethylene/α-olefin copolymer [A] and an ethylene/α-olefin copolymer [B].

[Ethylene/α-olefin copolymer [A]]

The ethylene/α-olefin copolymer [A] used in the invention is a random copolymer of ethylene with an α-olefin of 3 to 20 carbon atoms. Examples of the α-olefin of 3 to 20 carbon atoms employable for copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [A], it is desired that constituent units derived from ethylene are present in an amount of 55 to 99% by weight, preferably 65 to 98% by weight, more preferably 70 to 96% by weight, and constituent units derived from an α-olefin of 3 to 20 carbon atoms are present in an amount of 1 to 45% by weight, preferably 2 to 35% by weight, more preferably 4 to 30% by weight.

The composition of an ethylene/α-olefin copolymer is determined by $^{13}$C-NMR spectrum analysis of a sample prepared by uniformly dissolving about 200 mg of the copolymer in 1 ml of hexachlorobutadiene in a sample tube usually having a diameter of 10 mmφ under the conditions of a measuring temperature of 120° C., a measuring frequency of 25.05 MHz, a spectrum width of 1,500 Hz, a pulse repetition period of 4.2 sec and a pulse width of 6 μsec.

The ethylene/α-olefin copolymer [A] used in the invention has the following properties (A-ii) to (A-vii).

(A-ii) The density (d) is usually in the range of 0.880 to 0.940 g/cm³, preferably 0.890 to 0.935 g/cm³, more preferably 0.900 to 0.930 g/cm³.

In the invention, the density (d) of an ethylene/α-olefin copolymer is determined by means of a density gradient tube using a strand, which has been obtained at the time of a melt flow rate (MFR) measurement described below and which is treated by heating at 120° C. for 1 hour and slowly cooling to room temperature over 1 hour.

(A-iii) The intrinsic viscosity [$\eta_A$] as measured in decahydronaphthalene at 135° C. is in the range of 1.0 to 10.0 dl/g, preferably 1.25 to 8 dl/g, more preferably 1.27 to 6 dl/g.

(A-iv) The temperature Tm (° C.)) at which the endothermic curve of the copolymer measured by a differential scanning calorimeter (DSC) shows the maximum peak and the density (d) satisfy the relation:

Tm < 400 × d - 250, preferably Tm < 450 × d - 297, more preferably Tm < 500 × d - 344, particularly preferably Tm < 550 × d - 391.

In the invention, the temperature Tm (° C.)) at which the endothermic curve of an ethylene/α-olefin copolymer measured by a differential scanning calorimeter (DSC) shows the maximum peak is sought from an endothermic curve obtained by filling about 5 mg of a sample in an aluminum pan, heating to 200° C. at a rate of 10° C./min, holding the sample at 200° C. for 5 minutes, lowering the temperature to room temperature at a rate of 20° C./min, and then heating at a rate of 10° C./min. This measurement is carried out using a DSC-7 type apparatus produced by Perkin Elmer Co.

(A-v) The melt tension (MT (g)) and the melt flow rate (MFR) satisfy the relation:

$$MT > 2.2 \times MFR^{-0.84}.$$

The ethylene/α-olefin copolymer [A] employable for the invention is excellent in melt tension (MT) and has good moldability.

In the invention, the melt tension (MT (g)) of an ethylene/α-olefin copolymer is determined by measuring a stress given when a molten copolymer was stretched at a constant rate. That is, a powdery polymer was melted in a conventional manner, and the molten polymer was pelletized to give a measuring sample. Then, the MT of the sample was measured under the conditions of a resin temperature of 190° C., an extrusion rate of 15 mm/min and a take-up rate of 10 to 20 m/min using a MT measuring apparatus (produced by Toyo Seiki Seisakusho K. K.) having a nozzle diameter of 2.09 mm$\phi$ and a nozzle length of 8 mm. During the pelletization, to the ethylene/α-olefin copolymer [A] were added tri(2,4-di-t-butylphenyl)phosphate as a secondary antioxidant in an amount of 0.05% by weight, n-octadecyl-3-(4'-hydroxy-3',5'-di-t-butylphenyl)propionate as a heat stabilizer in an amount of 0.1% by weight and calcium stearate as a hydrochloric acid absorbent in an amount of 0.05% by weight.

The melt flow rate (MFR) is determined in accordance with ASTM D1238-65T under the conditions of a temperature of 190° C. and a load of 2.16 kg.

(A-vi) The flow index (FI (1/sec)) defined by a shear rate which is given when a shear stress of a molten copolymer at 190° C. reaches $2.4 \times 10^6$ dyne/cm$^2$ and the melt flow rate (MFR) satisfy the relation:

FI > 75 × MFR,
preferably FI > 100 × MFR,
more preferably FI > 120 × MFR.

The flow index (FI) is determined by extruding a resin from a capillary while changing a shear rate and measuring the shear rate given when the shear stress reaches the above-mentioned value. In this measurement, the same sample as described in the above-mentioned MT measurement is used, and the FI is measured under the conditions of a resin temperature of 190° C. and a shear stress of about $5 \times 10^4$ to $3 \times 10^6$ dyne/cm$^2$ using a capillary type flow property tester produced by Toyo Seiki Seisakusho K. K.

In the measurement, a diameter of the nozzle (capillary) is changed as follows depending on the MFR (g/10 min) of the resin to be measured:
in the case of MFR > 20:0.5 mm
in the case of 20 ≧ MFR > 3:1.0 mm
in the case of 3 ≧ MFR > 0.8:2.0 mm, and
in the case of 0.8 ≧ MFR:3.0 mm.

(A-vii) The quantity fraction (W (% by weight)) of a n-decane-soluble component at room temperature and the density (d) satisfy the relation:

W < 80 × $exp$(−100 (d−0.88))+0.1,
preferably W < 60 × $exp$(−100 (d−0.88))+0.1,
more preferably W < 40 × $exp$(−100 (d−0.88))+0.1.

In the invention, the measurement of the n-decane-soluble component quantity of an ethylene/α-olefin copolymer (polymer having a smaller soluble component quantity has a narrower composition distribution) is carried out by adding about 3 g of the copolymer to 450 ml of n-decane, dissolving the copolymer at 145° C., cooling the resulting solution to room temperature (about 23° C.), removing a n-decane-insoluble portion by filtering, and recovering a n-decane-soluble portion from the filtrate.

It may be concluded that the ethylene/α-olefin copolymer [A] which satisfies the above mentioned relation between the temperature (Tm) at which the endothermic curve measured by a differential scanning calorimeter (DSC) shows the maximum peak and the density (d), and the relation between the quantity fraction (W) of a n-decane-soluble component and the density (d), has a narrow composition distribution.

The ethylene/α-olefin copolymer [A] having the properties as mentioned above can be prepared by copolymerizing ethylene with an α-olefin of 3 to 20 carbon atoms in the presence of an olefin polymerization catalyst formed from (a) a transition metal compound catalyst component, (b) an organoaluminum oxy-compound catalyst component, (c) a carrier, and if necessary, (d) an organoaluminum compound catalyst component, all components being described later, in such a manner that the resulting copolymer would have a density of 0.880 to 0.940 g/cm$^3$.

[Ethylene/α-olefin copolymer [B] ]

The ethylene/α-olefin copolymer [B] for forming the ethylene copolymer composition of the invention is a random copolymer of ethylene and an α-olefin of 3 to 20 carbon atoms. Examples of the α-olefin of 3 to 20 carbon atoms employable for copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [B], it is desired that constituent units derived from ethylene are present in an amount of 55 to 99% by weight, preferably 65 to 98% by weight, more preferably 70 to 96% by weight, and constituent units derived from α-olefin of 3 to 20 carbon atoms are present in an amount of 1 to 45% by weight, preferably 2 to 35% by weight, more preferably 4 to 30% by weight.

The ethylene/α-olefin copolymer [B] has the following properties (B-ii) to (B-vii).

(B-ii) The density (d) is usually in the range of 0.910 to 0.960 g/cm$^3$, preferably 0.915 to 0.955 g/cm$^3$, more preferably 0.920 to 0.950 g/cm$^3$.

(B-iii) The intrinsic viscosity [$\eta_B$] as measured in decahydronaphthalene at 135° C. is in the range of 0.5 to 2.0 dl/g, preferably 0.55 to 1.9 dl/g, more preferably 0.6 to 1.8 dl/g.

(B-iv) The temperature Tm (° C.)) at which the endothermic curve of the copolymer measured by a differential scanning calorimeter (DSC) shows the maximum peak and the density (d) satisfy the relation:

Tm < 400 × d − 250,
preferably Tm < 450 × d − 297,
more preferably Tm < 500 × d − 344,
particularly preferably Tm < 550 × d − 391.

(B-v) The fraction of a n-decane-soluble component at room temperature (W % by weight) and the density (d) satisfy the relation:
in the case of MFR ≦ 10 g/10 min, W < 80 × $exp$(−100(d−0.88))+0.1, preferably W < 60 × exp(−100 (d−0.88))+0.1,
more preferably W < 40 × exp(−100 (d−0.88))+0.1,
in the case of MFR > 10 g/10 min, W < 80 × (MFR-9)$^{0.26}$ × exp (−100 (d−0.88))+0.1.

It may be concluded from the relation between the temperature (Tm) at which the endothermic curve measured by a differential scanning calorimeter (DSC) shows the maximum peak and the density (d), and the relation between the fraction (W) of a n-decane-soluble component and the density (d), that the ethylene/α-olefin copolymer [B] has a narrow composition distribution.

The ethylene/α-olefin copolymer [B] having the properties as mentioned above can be prepared by copolymerizing ethylene and an α-olefin of 3 to 20 carbon atoms in the presence of an olefin polymerization catalyst formed from (a') a transition metal compound catalyst component, (b) an organoaluminum oxy-compound catalyst component, (c) a carrier, and if necessary, (d) an organoaluminum compound catalyst component, all components being described later, in such a manner that the resulting copolymer would have a density of 0.910 to 0.960 g/cm$^3$.

Hereinafter, the catalyst components (a) a transition metal compound of Group IV of the periodic table which has a ligand having cylopentadienyl skeleton, (a') a transition metal compound of Group IV of the periodic table which has a ligand having cyclopentadienyl skeleton, (b) an organoaluminum oxy-compound, (C) a carrier, and (d) an organoaluminum compound which are used in the preparation of ethylene/α-olefin copolymers [A] and [B] contained in the ethylene copolymer composition of the present invention are explained below.

The transition metal compound catalyst component (a) (sometimes referred to as "component (a)" hereinafter) is a transition metal compound represented by the following formula [I] or [II].

$$MKL^1_{x-2}$$ 

In the formula [I], M is a transition metal atom selected from Group IVB of the periodic table, K and L$^1$ are each a ligand coordinating to the transition metal atom. The ligand K is a bidentate ligand formed by bonding the same or different indenyl groups, substituted indenyl groups or their partially hydrogenated products through a lower alkylene group, and the ligand L$^1$ is a hydrocarbon group of 1 to 12 carbon atoms, an alkoxy group, an aryloxy group, a halogen atom, a trialkylsilyl group or a hydrogen atom. X is a valance of the transition metal atom M.

$$ML^2_x$$ [II] 

In the formula [II], M is a transition metal atom selected from Group IVB of the periodic table, L$^2$ is ligand coordinating to the transition metal atom, at least two of L$^2$ are substituted cyclopentadienyl groups having 2–5 substituent groups selected from methyl group and ethyl group, and L$^2$ other than the substituted cyclopentadienyl group is a hydrocarbon group of 1 to 12 carbon atoms, an alkoxy group, an aryloxy group, a halogen atom, a trialkylsilyl group or a hydrogen atom. X is a valance of the transition metal atom M.

The transition metal compounds represented by the above formula [I] or [II] are explained below in detail.

In the above formula [I], M is a transition metal atom selected from Group IVB of the periodic table, and it is concretely zirconium, titanium or hafnium, preferably zirconium.

K is a ligand coordinating to the transition metal atom, and is a bidentate ligand formed by bonding the same or different indenyl groups, substituted indenyl groups or partially hydrogenated products of the indenyl or substituted indenyl groups through a lower alkylene group.

Concrete examples thereof include ethylenebisindenyl group, ethylenebis (4,5,6,7-tetrahydro-1-indenyl) group, ethylenebis (4-methyl-1-indenyl) group, ethylenebis(5-methyl-1-indenyl) group, ethylenebis (6-methyl-1-indenyl) group and ethylenebis(7-methyl-1-indenyl) group.

L$^1$ is a hydrocarbon group of 1 to 12 carbon atoms, an alkoxy group, an aryloxy group, a halogen atom, a trialkylsilyl group or a hydrogen atom.

Examples of the hydrocarbon group of 1 to 12 carbon atoms include alkyl group, cycloalkyl group, aryl group and aralkyl group. Concrete examples thereof include alkyl group such as methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group.

Examples of the alkoxy group include methoxy group, ethoxy group, n-propoxy group, isopropoxy group, n-butoxy group, isobutoxy group, sec-butoxy group, t-butoxy group, pentoxy group, hexoxy group and octoxy group.

Examples of the aryloxy group include phenoxy group and the like.

Examples of the halogen atom include fluorine, chlorine, bromine and iodine.

Examples of the trialkylsilyl group include trimethylsilyl group, triethylsilyl group and triphenylsilyl group.

Listed below are examples of the transition metal compound represented by the formula [I].

Ethylenebis(indenyl)zirconlure dichloride,
Ethylenebis(4-methyl-1-indenyl)zirconium dichloride,
Ethylenebis(4,5,6,7-tetrahydro-1-indenyl)zirconium dichloride,
Ethylenebis(5-methyl-1-indenyl)zirconlure dichloride,
Ethylenebis(6-methyl-1-indenyl)zirconium dichloride,
Ethylenebis(7-methyl-1-idenyl)zirconium dichloride,
Ethylenebis(4-methyl-1-idenyl)zirconium dibromide,
Ethylenebis(4-methyl-1-idenyl)zirconlure methoxychloride,
Ethylenebis(4-methyl-1-idenyl)zirconlure ethoxychloride,
Ethylenebis(4-methyl-1-idenyl)zirconium butoxychloride,
Ethylenebis(4-methyl-1-idenyl)zirconlure dimethoxide,
Ethylenebis(4-methyl-1-idenyl)zirconium methylchloride
Ethylenebis(4-methyl-1-idenyl) dimethylzirconium,
Ethylenebis(4-methyl-1-idenyl)zirconlure benzylchloride,
Ethylenebis(4-methyl-1-idenyl)dibenzylzirconium,
Ethylenehis(4-methyl-1-indenyl)zirconlure phenylchloride, and
Ethylenebis(4-methyl-1-idenyl)zirconium hydride chloride.

Also employable in the invention are transition metal compounds obtained by substituting titanium metal or hafnium metal for the zirconium metal in the above-exemplified zirconium compounds.

Of the above-exemplified transition metal compounds represented by the formula [I], particularly preferred are ethylenebis(indenyl)zirconium dichloride, ethylenebis(4-methyl-1-indenyl)zirconium dichloride and ethylenebis(4,5,6,7-etrahydro-1-indenyl)zirconium dichloride.

In the above-mentioned formula [II], M is a transition metal selected from Group IVB of the Periodic table, and concrete preferable examples of M include zirconium, titanium and hafnium. Of these, particularly preferred is zirconium.

$L^2$ is a ligand coordinated to the transition metal, and at least two of them are substituted cyclopentadienyl groups having 2–5 of substituents selected from methyl group and ethyl group. Each of ligand may be the same or different. The substituted cyclopentadienyl groups are the substituted cyclopentadienyl groups having 2 or more of substituents, preferably the substituted cyclopentadienyl groups having 2 or 3 of substituents, more preferably the substituted cyclopentadienyl groups having two substituents, particularly the 1,3-substituted cyclopentadienyl groups. Each of substituent may be the same or different.

In the above-mentioned formula [II], ligand $L^2$ other than the substituted cyclopentadienyl group is a hydrocarbon group of 1 to 12 carbon atoms, an alkoxy group, an aryloxy group, halogen, trialkylsilyl group or hydrogen as similar to the ligand $L^1$ in the above-mentioned formula [I].

The transition metal compound represented by the general formula [II] include, for example, Bis(dimethylcyclopentadienyl)zirconium dichloride,
Bis(diethylcyclopentadienyl)zirconium dichloride,
Bis(methylethylcyclopentadienyl)zirconium dichloride,
Bis(dimethylethylcyclopentatienyl)zirconium dichloride,
Bis(dimethylcyclopentadienyl)zirconium dibromide,
Bis(dimethylcyclopentadienyl)zirconium methoxychloride,
Bis(dimethylcyclopentadienyl)zirconium ethoxychloride,
Bis(dimethylcyclopentadienyl)zirconium butoxychloride,
Bis(dimethylcyclopentadienyl)zirconium diethoxide,
Bis(dimethylcyclopentadienyl)zirconium methylchloride,
Bis(dimethylcyclopentadienyl)zirconium dimethyl,
Bis(dimethylcyclopentadienyl)zirconium benzylchloride,
Bis(dimethylcyclopentadienyl)zirconium dibenzyl,
Bis(dimethylcyclopentadienyl)zirconium phenylchloride, and Bis(dimethylcyclopentadienyl)zirconium hydridechloride.

In the above exemplified compounds, di-substituted cyclopentadienyl include 1,2- and 1,3-substituted, and tri-substituted include 1,2,3- and 1,2,4-substituted.

There may also be used transition metal compounds obtained by substituting titanium or hafnium for zirconlure in the above-exemplified zirconium compounds.

In the above-mentioned transition metal compounds represented by the general formula [II], particularly preferred is Bis(1,3-dimethylcyclopentadienyl)zirconium dichloride,
Bis(1,3-diethylcyclopentadienyl)zirconium dichloride, or
Bis(1-methyl-3-ethylcyclopentadienyl)zirconium dichloride.

The transition metal compound catalyst component (a′) (sometimes referred to as "component (a′)" hereinafter) used in the preparation of the ethylene/α-olefin copolymer [B] is a compound of a transition metal in Group IV of the periodic table which contains a ligand having a cyclopentadienyl skeleton. There is no specific limitation on the component (a′), as far as it is a compound of a transition metal in Group IV of the periodic table which contains a ligand having a cyclopentadienyl skeleton. However, the component (a′) preferably is a transition metal compound represented by the following formula [III].

$$ML_x \qquad [III]$$

wherein M is a transition metal atom selected from Group IVB of the periodic table, L is a ligand coordinating to the transition metal, at least one of L is a ligand having a cyclopentadienyl skeleton, L other than the ligand having a cyclopentadienyl skeleton is a hydrocarbon group of 1 to 12 carbon atoms, an alkoxy group, an aryloxy group, a trialkylsilyl group, a $SO_3R$ group (R is a hydrocarbon group of 1 to 8 carbon atoms which may have a substituent group such as halogen), a halogen atom or a hydrogen atom, and X is a valance of the transition metal.

The transition metal compound represented by the above formula [III] includes the transition metal compound represented by the formula [I] and the transition metal compound represented by the formula [II] which are cited before as the transition metal catalyst component (a).

In the above-mentioned formula [III], M is a transition metal selected from Group IVB of the periodic table, and concrete preferable examples of M include zirconium, titanium and hafnium. Of these, particularly preferred is zirconium.

The ligands having a cyclopentadienyl skeleton include, for example, cyclopentadienyl; an alkyl-substituted cyclopentadienyl group such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyi and hexylcyclopentadienyl; indenyl, 4,5,6,7-tetrahydroindenyl and fluorenyl. These groups may be substituted with halogen atom or trialkylsilyl group, and the like.

Of these ligands coordinated to the transition metal, particularly preferred is the alkyl-substituted cyclopentadienyl group.

When the compound represented by the above formula [III] contains two or more of the groups having a cyclopentadienyl skeleton, two of them each having a cyclopentadienyl skeleton can be bonded together through an alkylene group (e.g., ethylene and propylene), a substituted alkylene group such as isopropylidene and diphenylmethylene, a silylene group, or a substituted silylene group such as dimethylsilylene, diphenylsilylene and methylphenylsilylene.

Concrete examples of the ligand L other than those having a cyclopentadienyl skeleton are as follows:

The hydrocarbon group having 1 to 12 carbon atoms includes, for example, an alkyl group, a cycloalkyl group, an aryl group and an aralkyl group, and concrete examples of these groups are as follows;

an alkyl group such as methyl, ethyl, propyl, isopropyl and butyl;

a cycloalkyl group such as cyclopentyl and cyclohexyl;

an aryl group such as phenyl and tolyl;

an aralkyl group such as benzyl and neophyl;

an alkoxy group such as methoxy, ethoxy and butoxy;

an aryloxy group such as phenoxy; and halogen such as fluorine, chlorine, bromine and iodine.

The ligand represented by SO₃R includes, for example, p-toluenesulfonate, methanesulfonate and trifluoromethanesulfonate.

Such a metallocene compound containing ligands each having a cyclopentadienyl skeleton (e.g. having a transition metal with a valence of 4) may be represented more concretely by the formula [III']

$$R^2_k R^3_l R^4_m R^5_n M \quad \text{[III']}$$

wherein M is a transition metal as mentioned above, $R^2$ is a group having a cyclopentadienyl skeleton (ligand), $R^3$, $R^4$ and $R^5$ are each a group having a cyclopentadienyl skeleton, an alkyl group, a cycloalkyl group, an aryl group, an aralkyl group, an alkoxygroup, an aryloxy group, trialkylsilyl group, SO₃R group, halogen or hydrogen, k is an integer of not less than 1, and $k+l+m+n=4$.

As the component (a'), preferred is the metallocene compound represented by the above formula [III'] in which at least two of $R^2$, $R^3$, $R^4$ and $R^5$, that is, $R^2$ and $R^3$ are each a group having a cyclopentadienyl skeleton (ligand). Said groups having a cyclopentadienyl skeleton may be bonded together through a group such as an alkylene group (e.g., ethylene and propylene), a substituted alkylene group such as isopropyltdene and diphenylmethylene, a silylene group, and a substituted silylene group such as dimethylsilylene, diphenylsilylene and methylphenylsilylene. Further, $R^4$ and $R^5$ are each a group having a cyclopentadienyl skeleton, an alkyl group, a cycloalkyl group, an aryl group, an aralkyl group, an alkoxy group, an aryloxy group, trialkylsilyl group, SO₃R group, halogen or hydrogen.

Listed below are concrete examples of the transition metal compound having zirconium as M.
Bis(indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenehis (indenyl)zirconium dichloride,
Ethylenehis(indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconium bis(methanesulfonate),
Ethylenebis(indenyl)zirconium bis(p-toluenesulfonate),
Ethylenehis(indenyl)zirconium bis(trifluoromethanesulfonate),
Ethylenebis(4,5,6,7-tetrahydroindenyl)zirconium dichloride,
Isopropylidene(cyclopentadienylfluorenyl)zirconium dichloride,
Isopropylidene(cyclopentadienyl-methyl cyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)-zirconium dichloride,
Dimethylsilylenebis(trimethylcyclopentadienyl)-zirconium dichloride,
Dimethylsilylenebis(indenyl)zirconium dichloride,
Dimethylsilylenebis(indenyl)zirconium bis (trifluoromethanesulfonate),
Dimethylsilylenebis(4,5,6,7-tetrahydroindenyl) zirconium dichloride,
Dimethylsilylenebis(cyclopentadienyl-fluorenyl) zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium,
Bis(cyclopentadienyl)zirconium methoxychloride,
Bis(cyclopentadienyl)zirconium ethoxychloride,
Bis(cyclopentadienyl)zirconium bis(methanesulfonate),
Bis(cyclopentadienyl)zirconium bis(p-toluene-sulfonate),
Bis(cyclopentadienyl)zirconium bis(trifluoromethane-sulfonate),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconium bis(trifluoromethanesulfonate),
Bis(ethyicyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopentadienyl)zirconium dichloride.

In the above exemplified compounds, di-substituted cyclopentadienyl include 1,2- and 1,3-substituted, and tri-substituted include 1,2,3- and 1,2,4-substituted. Further, the alkyl group such as propyl or butyl includes n-, i-, sec- and tert- isomers.

There may also be used transition metal compounds obtained by substituting titanium or hafnium for zirconium in the above-exemplified zirconium compounds.

The above listed compounds, the transition metal compounds represented by the above formula [I] and the transition metal compounds represented by the above formula II] are used as transition metal catalyst component (a'). Preferred are the above mentioned transition metal compounds represented by the formula [I] or [II].

Further, the transition metal catalyst component (a) used in the preparation of the ethylene/α-olefin copolymer A] and the transition metal catalyst component (a') used in the preparation of the ethylene/α-olefin copolymer [B] are preferably the same compounds.

Next, the organoaluminum oxy-compound (b) [hereinafter sometimes referred to as component (b)] is explained below.

The organoaluminum oxy-compound (b) may be a known benzene-soluble aluminoxane or the benzene-insoluble organoaluminum oxy-compound having been disclosed in Japanese patent L-O-P No. 276807/1990.

The above-mentioned aluminoxane may be prepared, for example, by the following procedures:

(1) a procedure for recovering an aluminoxane as its hydrocarbon solution which comprises adding an organoaluminum compound such as trialkylaluminum to a suspension in a hydrocarbon medium of a compound containing adsorbed water, or a salt containing water of crystallization such as magnesium chloride hydrate, copper sulfate hydrate, aluminum sulfate hydrate, nickel sulfate hydrate and cerium chloride hydrate, and reacting the organoaluminum compound; and (2) a procedure for recovering an aluminoxane as its hydrocarbon solution which comprises reacting water, ice or steam directly with an organoaluminum compound such as trialkylaluminum in a solvent such as benzene, toluene, ethyl ether and tetrahydrofuran.

(3) a procedure for recovering an aluminoxane which comprises reacting an organotinoxide such as dimethyltinoxide and dibutyltinoxide with an organoaluminum compound such as trialkylaluminum in a solvent such as decane, benzene or toluene.

Moreover, the aluminoxane may contain a small amount of an organometal component. Furthermore, the solvent or unreacted organoaluminum compound may be removed from the above-mentioned recovered aluminoxane-containing solution, by distillation, and the aluminoxane may be redissolved in a solvent.

Concrete examples of the organoaluminum compound used for the preparation of the aluminoxane include trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums such as tricyclohexylaluminum and tricyclooctylaluminum;

dialkylaluminum halides such as dimethylaluminum chloride, diethylaluminum chloride, diethylaluminum bromide and diisobutylaluminum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these compounds, trialkylaluminum is particularly preferable.

Furthermore, there may also be used as the organoaluminum compound isoprenylaluminum represented by the general formula

$(i\text{-}C_4H_9)_x Al_y (C_5H_{10})_z$ wherein x, y and z are each a positive nun%her, and $z \geq 2x$.

The organoaluminum compounds mentioned above may be used either singly or in combination.

Solvents used for the solutions of the aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halogenated compounds derived from the above-mentioned aromatic hydrocarbons, aliphatic hydrocarbons and alicyclic hydrocarbons, especially chlorinated and brominated hydrocarbons.

In addition, there may also be used ethers such as ethyl ether and tetrahydrofuran. Of these solvents as exemplified above, aromatic hydrocarbons are particularly preferred.

The benzene-insoluble organoaluminum oxy-compounds used as component (b) contain an Al component soluble in benzene at 60° C. in an amount of not greater than 10%, preferably not greater than 5%, particularly preferably not greater than 2% in terms of Al atom, and they are insoluble or sparingly soluble in benzene.

Solubility in benzene of such organoaluminum oxy-compounds as mentioned above is obtained by suspending in 100 ml of benzene the organoaluminum oxy-compound in an amount corresponding to 100 mg atoms in terms of Al, mixing the resulting suspension at 60° C. for 6 hours with stirring, filtering the resulting mixture with a G-5 glass filter equipped with a jacket kept at 60° C., washing 4 times the solid portion separated on the filter with 50 ml of benzene at 60° C., and measuring the amount (x mmole) of Al atoms present in the whole filtrate.

Next, the carrier (c) is explained below. The carrier (c) [hereinafter sometimes referred to as component (c)] is a solid inorganic or organic compound in granules or fine particles having a particle size of 10 to 300 μm, preferably 20 to 200 μm. Of these carriers, porous oxides are preferable as inorganic carriers. Concrete examples of the oxide carriers include $SiO_2$, $Al_2O_3$, MgO, $ZrO_2$, $TiO_2$, $B_2O_3$, CaO, ZnO, BaO, $ThO_2$, or a mixture of these compounds such as $SiO_2\text{-}MgO$, $SiO_2\text{-}Al_2O_3$, $SiO_2\text{-}TiO_2$, $SiO_2\text{-}V_2O_5$, $SiO_2\text{-}Cr_2O_3$ and $SiO_2\text{-}TiO_2\text{-}MgO$. Of these carriers, preferred are those comprising at least .one compound selected from the group consisting of $SiO_2$ and $Al_2O_3$ as a major component.

Furthermore, the above-mentioned inorganic oxide or oxides may also contain a small amount of a carbonate, a sulfate, a nitrate and an oxide such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $LiO_2$.

Though the porous inorganic carriers have different properties among them depending on the types and preparation methods thereof, the carriers preferably used in the invention have a specific surface area of 50 to 1000 m²/g, preferably 100 to 700 m²/g, a pore volume of desirably 0.3 to 2.5 cm²/g. The carriers are prepared if necessary by firing at a temperature of 100° to 1000° C., preferably 150° to 700° C.

Moreover, there can be mentioned organic compounds in solid granules or fine solid particles each having a particle size of 10 to 300 μm as carriers which can be used as the component (c). Examples of these organic compounds include (co)polymers containing as the main component constituent units derived from an α-olefin of 2 to 14 carbon atoms, such as ethylene, propylene, 1-butene and 4-methyl-1-pentene, or polymers or copolymers containing as the main component constituent units derived from vinylcyclohexane or styrene.

The catalyst used in the present invention comprises the above-mentioned transition metal compound (a), organoaluminum oxy-compound (b) and carrier (c). However, if necessary, an organoaluminum compound (d) may also be used as the catalyst component.

Examples of the organoaluminum compound (d) hereinafter sometimes referred to as component (d)] include an organoaluminum compound represented by the following formula [IV].

$$R^1_n AlX_{3-n} \quad [IV]$$

wherein $R^1$ is a hydrocarbon group of 1 to 12 carbon atoms, X is halogen or hydrogen, and n is 1 to 3.

In the above formula [IV], $R^1$ is a hydrocarbon group of 1 to 12 carbon atoms, for example, an alkyl group, a cycloalkyl group or an aryl group. Concrete examples of $R^1$ include methyl, ethyl, n-propyl, isopropyl, isobutyl, pentyl, hexyl, octyl, cyclopentyl, cyclohexyl, phenyl and tolyl.

Concrete examples of such organoaluminum compounds (d) include trialkylaluminum such as trimethylaluminum, triethylaluminum, triisopropylaluminum, triisobutylaluminum, trioctylaluminum and tri-2-ethylhexylaluminum;

alkenylaluminum such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride.

Furthermore, there may also be used other organoaluminum compounds represented by the following formula [V] as the organoaluminum compound catalyst component (d);

$$R^1_n AlY_{3-n} \quad [V]$$

wherein $R^1$ is as defined previously, Y is $-OR^2$, $-OSiR^3_3$, $-OAlR^4_2$, $-NR^5_2$, $'SIR^6_3$ or $-N(R^7)AlR^8_2$, n is 1 to 2, $R^2$, $R^3$, $R^4$ and $R^8$ are each methyl, ethyl, isopropyl, isobutyl, cyclohexyl or phenyl, $R^5$ is hydrogen, methyl, ethyl, isopropyl, phenyl or trimethylsilyl, $R^6$ and $R^7$ are each methyl or ethyl.

The organoaluminum compounds as mentioned above include, in concrete, such compounds as enumerated below. (1) Compounds of the formula $R^1_n Al(OR^2)_{3-n}$ such as dimethylaluminum methoxide, diethylaluminum ethoxide and diisobutylaluminum methoxide. (2) Compounds of the formula $R^1_n Al(OSiR^3_3)_{3-n}$ such as Et$_2$Al(OSiMe$_3$), (iso-Bu)$_2$Al(OSiMe$_3$) and (iso-Bu)$_2$Al(OSiEt$_3$) . (3) Compounds of the formula $R^1_n Al(OAlR^4_2)_{3-n}$ such as Et$_2$AlOAlEt$_2$ and (iso-Bu)$_2$AlOAl(iso-Bu)$_2$. (4) Compounds of the formula $R^1_n Al(NR^5_2)_{3-n}$ such as Me$_2$AlNEt$_2$, Et$_2$AlNHMe, Me$_2$AlNHEt, Et$_2$AlN(SiMe$_3$)$_2$, (iso-Bu)$_2$AlN(SiMe$_3$)$_2$. (5) Compounds of the formula $R^1_n Al(SiR^6_3)_{3-n}$ such as (iso-Bu)$_2$AlSiMe$_3$. (6) Compounds of the formula $$R^1_n Al(NAlR^8_2)_{3-n}$$
$$\quad\quad\quad | $$
$$\quad\quad\quad R^7$$

such as

Et$_2$AlNAlEt$_2$ and (iso-Bu)$_2$AlNAl(iso-Bu)$_2$.
$\quad\quad |\quad\quad\quad\quad\quad\quad\quad\quad |$
$\quad\quad$Me$\quad\quad\quad\quad\quad\quad\quad\quad$Et Of the organoaluminum compounds as exemplified above, preferred are those having the formulas $$R^1_3Al, \ R^1_n Al(OR^2)_{3-n} \text{ and } R^1_n Al(OAlR^4_2)_{3-n},$$

and particularly preferred are those having the above-mentioned formulas in which $R^1$ is isoalkyl and n is 2.

The ethylene/α-olefin copolymers [A] and [B] used in the present invention can be prepared by the olefin polymerization catalyst formed by contacting the above-mentioned components (a), (b), (c) and if necessary, component (d). Though the mixing of these components (a), (b), (c) and (d) may be conducted in arbitrarily selected order, the mixing and contacting is preferably conducted in the order of:

mixing and contacting the components (b) and (c), followed by mixing and contacting the component (a), and if necessary, mixing and contacting the component (d).

The mixing of the above-mentioned components (a), (a'), (b), (c) and (d) can be carried out in an inert hydrocarbon.

As the inert hydrocarbon solvent for preparing the catalyst, there may be mentioned an aliphatic hydrocarbon, such as propane, butane, pentane, hexane, heptane, octane, decane, dodecane and kerosene;

an alicyclic hydrocarbon, such as cyclopentane, cyclohexane and methylcyclopentane; an aromatic hydrocarbon, such as benzene, toluene and xylene;

a halogenated hydrocarbon, such as ethylene chloride, chlorobenzene and dichloromethane; and a mixture thereof.

In contacting and mixing of the components (a), (a'), (b), (c) and if necessary, component (d), the component (a) is used usually in an amount of $5 \times 10^{-6}$ to $5 \times 10^{-4}$ mol, preferably $1 \times 10^{-5}$ to $2 \times 10^{-4}$ mol based on 1 g of the component (c) , and the concentration thereof is $1 \times 10^{-4}$ to $2 \times 10^{-2}$ mol/l, preferably $2 \times 10^{-4}$ to $1 \times 10^{-2}$ mol/l. The atomic ratio (Al/transition metal) of the aluminum in the component (b) to the transition metal in the component (a) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5.

The components (a), (b) and (c), and if necessary, the component (d) are mixed and contacted at a temperature of usually −50° to 150° C., preferably −20° to 120° C., with a contact time of 1 minute to 50 hours, preferably 10 minutes to 25 hours.

In the catalyst for preparing the ethylene/α-olefin copolymers [A] and [B] obtained as described above, it is desirable that the transition metal derived from component (a) is supported in an amount of $5 \times 10^{-6}$ to $5 \times 10^{-4}$ g atom, preferably $1 \times 10^{-5}$ to $2 \times 10^4$ g atom, and aluminum derived from components (b) and (d) is supported in an amount of $10^3$ to $5 \times 10^{-2}$ g atom, preferably $2 \times 10^{-3}$ to $2 \times 10^{-2}$ g atom, all the amounts being based on 1 g of the component (c).

Further, the catalyst for preparing the ethylene/α-olefin copolymers [A] and [B] used in the present invention may be a prepolymerized catalyst obtained by prepolymerization of olefin in the presence of the above-mentioned components (a), (a'), (b) and (c), and if necessary, (d).

The prepolymerized catalyst can be prepared by mixing the component (a), the component (a'), the component (b), the component (c), and if necessary, the component (d), introducing olefin to the resulting mixture in the inert hydrocarbon solvent, and carrying out prepolymerization.

The olefins which can be prepolymerized include ethylene and α-olefins each having 3 to 20 carbon atoms, for example, propylene, 1-butene, 1-pentene, 4-methyl-1-pentene, 1-hexene, 1-octene, 1-decene, 1-dodecene and 1-tetradecene. Of these, particularly preferred is ethylene or the combination of ethylene and α-olefin used in the polymerization.

During the prepolymerization, the component (a) is used usually in a concentration of is $1 \times 10^{-6}$ to $2 \times 10^{-2}$ mol/l, preferably $5 \times 10^{-5}$ to $1 \times 10^{-2}$ mol/l and amount thereof is usually $5 \times 10^{-6}$ to $5 \times 10^{-4}$ mol, preferably $1 \times 10^{-5}$ to $2 \times 10^{-4}$ mol based on 1 g of the component (c). The atomic ratio (Al/transition metal) of the aluminum in the component (b) to the transition metal in the component (a) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5. The prepolymerization is carried out at a temperature of −20° to 80° C., preferably 0° to 60° C., with a time of 0.5 to 100 hours, preferably 1 to 50 hours.

The prepolymerized catalyst can be prepared as described below. First, the carrier (component (c)) is suspended in the inert hydrocarbon. To the suspension, the organoaluminum oxy-compound catalyst component (component (b)) is introduced, and reacted for predetermined period. Successively, supernatant is removed, and the resulting solid component is re-suspended in the inert hydrocarbon. Into the system, the transition metal compound catalyst component (component (a)) is added and reacted for predetermined period. Then, supernatant is removed to obtain a solid catalyst component. Continuously, the solid catalyst component obtained above is added into inert hydrocarbon containing the organoaluminum compound catalyst component (component (d)), and olefin is introduced therein to obtain the prepolymerized catalyst.

An amount of prepolymerized polyolefin produced in the prepolymerization is, desirably based on 1 g of the carrier (c), of 0.1 to 500 g, preferably 0.2 to 300 g, more preferably 0.5 to 200 g. In the prepolymerized catalyst (1), component (a) is desirably supported in an amount in terms of transition metal atom, based on 1 g of the carrier (c), of about $5 \times 10^{-6}$ to $5 \times 10^{-4}$ g atom, preferably $1 \times 10^{-5}$ to $2 \times 10^{-4}$ g atom. Further, a molecular ratio (Al/M) of aluminum atom (Al) derived from components (b) and (d) to transition metal atom (M) derived from component (a) is usually 5 to 200, preferably 10 to 150.

The prepolymerization may be carried out either batchwise or continuously, and under reduced pressure, normal pressure or applied pressure. During the prepolymerization, hydrogen may be allowed to be present to obtain a prepolymer desirably having an intrinsic viscosity [η] of 0.2 to 7 dl/g, preferably 0.5 to 5 dl/g as measured in decahydronaphthalene at least 135° C.

The ethylene/α-olefin copolymers [A] and [B] used in the present invention are obtained by copolymerizing ethylene with an α-olefin having 3 to 20 carbon atoms such as propylene, 1-butene, 1-pentene, 1-hexene, 4-methyl-1pentene, 1-octene, 1-decene, 1-dodecene, 1-tetradecene, 1-hexadecene, 1-octadecene and 1-eicosene in the presence of the above-mentioned olefin polymerization catalyst.

Copolymerization of ethylene and α-olefin is carried out in a gas phase or liquid phase, for example, in slurry. In the slurry polymerization, an inactive hydrocarbon or the olefin itself may be used as a solvent.

Concrete examples of the inactive hydrocarbon solvent include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and gas oil. Of these inactive hydrocarbons, preferred are aliphatic hydrocarbons, alicyclic hydrocarbons and petroleum fractions.

When the copolymerization is carried out by the slurry method or the gas phase method, the olefin polymerization catalyst is used at such amount that the concentration of the transition metal compound becomes usually $10^{-8}$ to $10^{-3}$ g atom/liter, preferably $10^{-7}$ to $10^{-4}$ g atom/liter in terms of the transition metal in the polymerization reaction system.

Furthermore, in the polymerization, an organoaluminum oxy-compound similar to the catalyst component (b) and/or an organoaluminum compound (d) may be added. In this case, the atomic ratio (Al/M) of the aluminum atom (Al) derived from the organoaluminum oxy-compound and the organoaluminum compound to the transition metal atom (M) derived from the transition metal compound catalyst component (a) is 5 to 300, preferably 10 to 200, more preferably 15 to 150.

When the ethylene/α-olefin copolymers [A] and [B] are prepared by the slurry polymerization, the polymerization temperature is usually −50° to 100° C., preferably 0° to 90° C. When the ethylene/α-olefin copolymers [A] and [B] are prepared by the gas phase polymerization, the polymerization temperature is usually 0° to 120° C., preferably 20° to 100° C.

The polymerization is carried out usually at a normal pressure to 100 kg/cm², preferably under a pressure condition of 2 to 50 kg/cm². The polymerization can be carried out either batchwise, semicontinuously or continuously .

When the ethylene/α-olefin copolymer [A] is prepared by the slurry polymerization, the polymerization temperature is usually −50° to 90° C., preferably 0° to 80° C. When the ethylene/α-olefin copolymer [A] is prepared by the gas phase polymerization, the polymerization temperature is usually 0° to 90° C., preferably 20° to 80° C.

When the ethylene/α-olefin copolymer [B] is prepared by the slurry polymerization, the polymerization temperature is usually −30° to 100° C., preferably 20° to 90° C. When the ethylene/α-olefin copolymer [B] is prepared by the gas phase polymerization, the polymerization temperature is usually 20° to 120° C., preferably 40° to 100° C.

[Ethylene/α-olefin copolymer composition]

The ethylene/Cα-olefin copolymer composition according to the present invention comprises the ethylene/α-olefin copolymer [A] and the ethylene/α-olefin copolymer [B]. In this composition, the ethylene/α-olefin copolymer [A] is contained in an amount of 5 to 95% by weight, preferably 10 to 90% by weight, and the ethylene/α-olefin copolymer [B] is contained in an amount of 5 to 95% by weight, preferably 10 to 90% by weight.

The ethylene/α-olefin copolymer [A] and the ethylene/α-olefin copolymer [B] are appropriately combined so that a density ratio ( [A] / [B] ) of the ethylene/α-olefin copolymer [A] to the ethylene/α-olefin copolymer [B] is less than 1, preferably in the range of 0.930 to 0.999. Further, they are also appropriately combined so that a ratio ( $[\eta_A]/[\eta_B]$ ) of the intrinsic viscosity $[\eta_A]$ of the ethylene/α-olefin copolymer [A] to the intrinsic viscosity $[\eta_B]$ of the ethylene/α-olefin copolymer [B] is not less than 1, preferably in the range of 1.05 to 10, more preferably 1.1 to 5.

The ethylene/α-olefin copolymer composition has a density of usually 0.890 to 0.955 g/cm$^3$, preferably 0.900 to 0.950 g/cm$^3$, and has a melt flow rate (MFR) of 0.1 to 100 g/10 min, preferably 0.2 to 50 g/10 min.

The ethylene copolymer composition according to the invention may contain various additives if desired, for example, weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, provided that the object of the invention is not marred.

The ethylene/α-olefin copolymer composition according to the present invention can be prepared by known processes, for example, processes described below.

(1) A process of mechanically blending the ethylene/α-olefin copolymer [A], the ethylene/α-olefin copolymer [B], and if necessary, other optional components by the use of an extruder, a kneader or the like.

(2) A process comprising dissolving the ethylene/α-olefin copolymer [A], the ethylene/α-olefin copolymer [B], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A], the ethylene/α-olefin copolymer [B], and if necessary, other optional components in an appropriate good solvent to prepare solutions, then mixing the solutions, and removing the solvent from the resulting mixture.

(4) A process in any combination of the above processes (1) to (3).

Further, the ethylene/α-olefin copolymer composition according to the present invention may be prepared by forming the ethylene/α-olefin copolymer [A] and the ethylene/α-olefin copolymer [B] in two or more copolymerization stages having reaction conditions different from each other, or may be prepared by separately forming the ethylene/α-olefin copolymer [A] and the ethylene/α-olefin copolymer [B] by the use of plural polymerizers.

Further, the ethylene/α-olefin copolymer composition according to the present invention may be prepared by forming the ethylene/α-olefin copolymer [A] and the ethylene/α-olefin copolymer [B] in two or more copolymerization stages having reaction conditions different from each other by the use of one or more polymerizers.

The ethylene copolymer composition according to the present invention may be processed by a conventional molding method, for example, air-cooling inflation molding, two-stage air-cooling inflation molding, high-speed inflation molding, T-die film molding, water-cooling inflation molding or the like, to obtain a film. The film thus obtained has excellent transparency, mechanical strength and blocking resistance, and retains properties inherent in general LLDpE, such as heat-sealing properties, hot-tack properties and heat resistance. Further, the film is free from surface stickiness because each of the ethylene/α-olefin copolymer [A] and the ethylene/α-olefin copolymer [B] has a prominently narrow composition distribution. Moreover, because of low stress within the high-shear region, the ethylene copolymer composition can be extruded at a high speed, and thus consumption of electric power is small, resulting in economical advantage.

Films obtained from the ethylene copolymer composition of the invention are suitable for, for example, standard bags, heavy duty bags, wrapping films, materials for laminates, sugar bags, packaging bags for oily goods, packaging bags for moist goods, various packaging films such as those for foods, bags for liquid transportation and agricultural materials. The films may also be used as multi-layer films by laminating the films on various substrates such as a nylon substrate and a polyester substrate. Further, the films may be used for liquid transportation bags obtained by blow molding, bottles obtained by blow molding, tubes and pipes obtained by extrusion molding, pull-off caps, injection molded products such as daily use miscellaneous goods, fibers, and large-sized molded articles obtained by rotational molding.

EFFECT OF THE INVENTION

The ethylene copolymer composition of the present invention is formed by blending the ethylene/α-olefin copolymers [A] and [B] having specific properties and wherein both are different in density and MFR from each other. Therefore, the composition is excellent in heat stability and moldability, and from this ethylene copolymer composition, a film showing high transparency, high mechanical strength and high blocking resistance can be obtained.

[Example]

The present invention is further described below with reference to examples, but it should be construed that the present invention is in no way limited to those examples.

In this specification, physical properties of films were evaluated in the following manner.

Haze

The haze was measured in accordance with ASTM-D-1003-61.

Film impact

The film impact was measured by a pendulum type film impact tester produced by Toyo Seiki Seisakusho K. K.

Blocking force

Inflation films each having a size of 10 cm (width)×20 cm were sandwiched between two sheets of typing paper, then further sandwiched between glass plates, and a load of 10 kg was applied to them in an air bath of 50° C. for 24 hours. Then, the films were fitted to an open tool to separate the films at a rate of 200 mm/min. A load at the time when the films are separated is A (g), the blocking force F (g/cm) is determined by the following formula.

F=A/width of sample

As the F value becomes smaller, blocking of the films come to hardly take place, that is, the film has a higher blocking resistance.

Preparation Example 1

Preparation of an ethylene/α-olefin copolymer [A]

[preparation of a solid catalyst]

7.9 kg of silica having been dried at 250° C. for 10 hours was suspended in 121 liters of toluene, and the resultant suspension was cooled to 0° C. Thereafter, to the suspension was dropwise added 41 liters of a toluene solution of methylaluminoxane (Al=1.47 mol/l) over 1 hour. During the addition, the temperature of the system was kept at 0° C. Successively, the reaction was carried out at 0° C. for 30 minutes. Then, the temperature of the system was elevated to 95° C. over 1.5 hours, and the reaction was carried out at the same temperature for 4 hours. Thereafter, the temperature of the system was lowered to 60° C., and the supernatant liquid was removed by decantation. The solid component obtained above was washed twice with toluene, and then again suspended in 125 liters of toluene. To the reaction system was dropwise added 20 liters of a toluene solution of bis(1,3-dimethylcyclopentadienyl)zirconium dichloride (Zr=28.4 mmol/l) at 30° C. over 30 minutes, and the reaction was further carried out at 30° C. for 2 hours. Then, the supernatant liquid was removed, and the residue was washed twice with hexane to obtain a solid catalyst containing 4.6 mg of zirconium based on 1 g of the solid catalyst.

[preparation of a prepolymerized catalyst]

To 160 liters of hexane containing 16 mol of triisobutylaluminum was added 4.3 kg of the solid catalyst obtained in the above, and the resultant mixture was subjected to prepolymerization with ethylene at 35° C. for 3.5 hours to obtain a prepolymerized catalyst in which polyethylene was present in an amount of 3 g based on 1 g of the solid catalyst. The ethylene polymer had an intrinsic viscosity [η] of 1.27 dl/g.

[Polymerization]

In a continuous fluidized bed gas phase reactor, ethylene was copolymerized with 1-hexene at a total pressure of 18 kg/cm$^2$-G and a polymerization temperature of 75° C. To the reactor were continuously fed the prepolymerzied catalyst prepared in the above at a feed rate of 0.05 mmol/hour in terms of zirconium atom and triisobutylaluminum at a feed rate of 10 mmol/hour while continuously feeding ethylene, 1-hexene, hydrogen and nitrogen to maintain a constant gas composition in the reactor (gas composition: 1-hexene/ethylene=0.041, hydrogen/ethylene=0.0011, ethylene concentration=10%).

Thus, an ethylene/α-olefin copolymer (A-1) was obtained in an amount of 6.0 kg/hour. The copolymer had a density of 0.906 g/cm$^3$ and a melt flow rate (MFR) of 0.32 g/10 min. The temperature at the maximum peak of the DSC endothermic curve (Tm) of the copolymer was 92.5° C. Further, the copolymer had a melt tension (MT) of 6.2 g at 190° C. and a flow index (FI) of 89 (1/sec). The amount of the decane-soluble portion in the copolymer was 0.52% by weight at room temperature. The number of unsaturated bond in the copolymer was 0.090 per 1,000 carbon atoms, and was 0.90 per one molecule of the polymer.

Example 1

[preparation of an ethylene/α-olefin copolymer composition]

The ethylene/αz-olefin copolymer (A-1) (density: 0.906 g/cm$^3$) obtained in preparation Example 1 and an ethylene/α-olefin copolymer (B-1) (density: 0.949 g/cm$^3$) prepared in the same manner as described in preparation Example 1 except for adjusting the comonomer amount to that set forth in Table 1 were melt kneaded in a weight ratio of 57/43 [(A-1)/(B-1)], to prepare an ethylene/α-olefin copolymer composition.

The ethylene copolymer composition thus obtained had a density of 0.926 g/cm$^3$ and MFR of 1.1 g/10 min.

[Film formation]

The ethylene copolymer composition obtained in the above was subjected to inflation by the use of a single-screw extruder (20 mmφ·L/D=26) equipped with a die of 25 mmφ (lip width: 0.7 mm) and a single-slit air ring under the conditions of an air flow rate of 90 l/min, an extrusion rate of 9 g/min, a blow ratio of 1.8, a take-up rate of 2.4 m/min and a processing temperature of 200° C., to form a film having a thickness of 30 μm.

Melt properties of the ethylene copolymer composition and physical properties of the film formed from the composition are set forth in Table 2

Reference Example 1

[preparation of an ethylene/α-olefin copolymer (C-1)]

The procedure of preparation Example 1 was repeated except for adjusting the comonomer amount to that set forth in Table 1, to obtain an ethylene/α-olefin copolymer (C-1).

Thus obtained ethylene/α-olefin copolymer (C-1) had a density of 0.927 g/cm$^3$ and MFR of 1.0 g/10 min., which are approximately similar to those of the ethylene copolymer composition prepared in Example 1.

[Film formation ]

The procedure of film formation in Example 1 was repeated except for using the ethylene/α-olefin copolymer (C-1) prepared in Example 1, to form a film having a thickness of 30 μm.

Melt properties of the ethylene/α-olefin copolymer (C-1) and physical properties of the film formed from the copolymer are set forth in Table 2.

It was confirmed from Example 1 and Reference Example 1 that the film obtained from the ethylene copolymer composition prepared in Example 1 is excellent in film impact, flow index (FI) within the high-shear region, and blocking resistance compared with the film obtained from the ethylene/α-olefin copolymer (C-1) having a similar density, MFR and melt tension.

Example 2

[preparation of an ethylene/(α-olefin copolymer composition]

An ethylene/α-olefin copolymer (A-2) (density: 0.907 g/cm$^3$) and an ethylene/α-olefin copolymer (B-2) (density: 0.943 g/cm$^3$), each of said copolymers having been prepared in the same manner as described in preparation Example 1 except for adjusting the comonomer amount to that set forth in Table 1, were melt kneaded in a weight ratio of 60/40 [(A-2)/(B-2)], to obtain an ethylene/α-olefin copolymer composition.

The ethylene copolymer composition thus obtained had a density of 0.921 g/cm$^3$ and MFR of 2.0 g/10 min.

[Film formation]

From the ethylene copolymer composition obtained in the above, a film having a thickness of 30 μm was formed in a manner similar to that of Example 1.

Melt properties of the ethylene copolymer composition and physical properties of the film formed from the composition are set forth in Table 2.

Reference Example 2

[preparation of an ethylene/α-olefin copolymer (C-2)]

The procedure of preparation Example 1 was repeated except for adjusting the comonomer amount to that set forth in Table 1, to obtain an ethylene/α-olefin copolymer (C-2).

Thus obtained ethylene/α-olefin copolymer (C-2) had a density of 0.920 g/cm$^3$ and MFR of 2.0 g/10 min., which are approximately similar to those of the ethylene copolymer composition prepared in Example 2.

[Film formation]

The procedure of film formation in Example 1 was repeated except for using the ethylene/α-olefin copolymer (C-2), to form a film having a thickness of 30 μm.

Melt properties of the ethylene/α-olefin copolymer (C-2) and physical properties of the film formed from the copolymer are set forth in Table 2.

It was confirmed from Example 2 and Reference Example 2 that the film obtained from the ethylene copolymer composition prepared in Example 1 is excellent in mechanical strength, flow index (FI) within the high-shear region, and blocking resistance compared with the film obtained from the ethylene/α-olefin copolymer (C-2) having a similar density, MFR and melt tension.

Comparative Example 1

[preparation of an ethylene/α-olefin copolymer composition]

An ethylene/α-olefin copolymer (A-4) (density: 0.915 g/cm$^3$) and an ethylene/α-olefin copolymer (B-4) (density: 0.933 g/cm$^3$), each of said copolymers having been prepared in the same manner as described in preparation Example 1 except for replacing the zirconium catalyst system with a titanium type catalyst system described in Japanese patent publication No. 63(1988)-54289, and adjusting the comonomer amount to that set forth in Table 1, were melt kneaded in a weight ratio of 60/40 [(A-4)/(B-4)], to obtain an ethylene/α-olefin copolymer composition.

The ethylene copolymer composition thus obtained had a density of 0.922 g/cm$^3$ and MFR of 2.0 g/10 min.

[Film formation]

From the ethylene. copolymer composition obtained in the above, a film having a thickness of 30 μm was formed in a manner similar to that of Example 1.

Melt properties of the ethylene copolymer composition and physical properties of the film formed from the composition are set forth in Table 2.

The ethylene copolymer composition obtained above was lower in the melt tension than the ethylene/α-olefin copolymer composition of Example 2 having almost the same MFR and density, and the film obtained above was inferior to the film formed from the ethylene/α-olefin copolymer composition of Example 2 in the transparency, the film impact and the blocking resistance.

Comparative Example 2

[preparation of an ethylene/α-olefin copolymer (C-4)]

The procedure of Comparative Example 1 was repeated except for adjusting the comonomer amount to that set forth in Table 1, to obtain an ethylene/α-olefin copolymer (C-4).

Thus obtained ethylene/α-olefin copolymer (C-4) had a density of 0.922 g/cm$^3$ and MFR of 1.9 g/10 min., which are approximately similar to those of the ethylene copolymer composition prepared in Comparative Example 1.

[Film formation]

The procedure of film formation in Example 1 was repeated except for using the ethylene/α-olefin copolymer (C-4), to form a film having a thickness of 30 μm.

Melt properties of the ethylene/α-olefin copolymer (C-4) and physical properties of the film formed from the copolymer are set forth in Table 2.

It was confirmed from Comparative Example 1 and Comparative Example 2 that the ethylene copolymer composition obtained in Comparative Example 1 was lower in the improvement of the flow index (FI) within high-shear region compared with Examples 1 and 2, and the film obtained above was inferior in the improvement of the film impact and the blocking resistance.

Example 3

[preparation of an ethylene/α-olefin copolymer composition]

An ethylene/α-olefin copolymer (A-3) (density: 0.916 g/cm$^3$) prepared in the same manner as described in preparation Example 1 except for adjusting the comohomer amount to that set forth in Table 1 and an ethylene/α-olefin copolymer (B-3) (density: 0.924 g/cm$^3$) prepared in the same manner as described in preparation Example 1 except for replacing bis(1,3-dimethylcyclopentadienyl)zirconium dichloride with bis(1,methyl-3-n-butylcyclopentadienyl)zirconium dichloride and adjusting the comonomer amount to that set forth in Table 1 were melt kneaded in a weight ratio of 20/80 [(A-3)/(B-3) ], to obtain an ethylene/α-olefin copolymer composition.

The ethylene copolymer composition thus obtained had a density of 0.922 g/cm$^3$ and MFR of 1.4 g/10 min.

[Film formation]

From the ethylene copolymer composition obtained in the above, a film having a thickness of 30 μm was formed in a manner similar to that of Example 1.

Melt properties of the ethylene copolymer composition and physical properties of the film formed from the composition are set forth in Table 2.

Reference Example 3

[preparation of an ethylene/α-olefin copolymer (C-3)]

The procedure of preparation Example 1 was repeated except for adjusting the comonomer amount to that set forth in Table 1, to obtain an ethylene/α-olefin copolymer (C-3).

Thus obtained ethylene/α-olefin copolymer (C-3) had a density of 0.922 g/cm$^3$ and MFR of 1.5 g/10 min., which are approximately similar to those of the ethylene copolymer composition prepared in Example 3.

[Film formation]

The procedure of film formation in Example 1 was repeated except for using the ethylene/α-olefin copolymer (C-3), to form a film having a thickness of 30 μm.

Melt properties of the ethylene/α-olefin copolymer (C-3) and physical properties of the film formed from the copolymer are set forth in Table 2.

It was confirmed from Example 3 and Reference Example that the film obtained form the ethylene copolymer composition prepared in Example 3 is excellent in transparency, strength and blocking resistance compared with the film obtained from the ethylene/α-olefin copolymer (C-3) having a similar density, MFR and melt tension.

TABLE 1

| Code No. | Comonomer | Comonomer contained mol % | Density g/cm$^3$ | MFR g/10 min | [η] g/dl |
|---|---|---|---|---|---|
| A-1 | 1-hexene | 4.9 | 0.906 | 0.32 | 1.91 |
| A-2 | 1-hexene | 4.8 | 0.907 | 0.35 | 1.88 |
| A-3 | 1-hexene | 3.3 | 0.916 | 0.24 | 2.00 |
| A-4 | 1-hexene | 6.1 | 0.915 | 0.65 | 2.00 |
| B-1 | 1-hexene | 0.9 | 0.949 | 10.7 | 1.11 |
| B-2 | 1-hexene | 1.0 | 0.943 | 165 | 0.68 |
| B-3 | 1-hexene | 2.6 | 0.924 | 2.1 | 1.59 |
| B-4 | 1-hexene | 2.8 | 0.933 | 19.2 | 1.04 |
| C-1 | 1-hexene | 1.9 | 0.927 | 1.0 | 1.60 |
| C-2 | 1-hexene | 3.0 | 0.920 | 2.0 | 1.44 |
| C-3 | 1-hexene | 2.8 | 0.922 | 1.5 | 1.70 |
| C-4 | 1-hexene | 3.6 | 0.922 | 1.9 | 1.62 |

|  | Tm °C. | Formula (1) | MT g | Formula (2) | FI s$^{-1}$ | Formula (3) | Decane-soluble portion weight % | Formula (4) | Unsaturated bond*[1] |
|---|---|---|---|---|---|---|---|---|---|
| A-1 | 92.5 | 112.4 | 6.2 | 5.7 | 89 | 24 | 0.52 | 6.04 | 0.09 |
| A-2 | 92.8 | 112.8 | 5.9 | 5.3 | 92 | 27 | 0.55 | 5.48 | 0.12 |
| A-3 | 107.0 | 116.4 | 7.7 | 7.3 | 63 | 18 | 0.15 | 2.29 | 0.16 |
| A-4 | 120.3 | 116.0 | 2.8 | 3.2 | 140 | 49 | 13.5 | 2.50 | 0.23 |
| B-1 | 120.1 | 129.6 | 0.1> | — | 1390 | — | 0.08 | 0.19 | 0.06 |
| B-2 | 118.6 | 127.2 | 0.1> | — | 12400 | — | 0.45 | 0.65 | 0.08 |
| B-3 | 115.0 | 119.6 | 0.9 | — | 130 | — | 0.08 | 1.08 | 0.10 |
| B-4 | 128.0 | 123.2 | 0.1> | — | 1440 | — | 2.20 | 0.83 | 0.28 |
| C-1 | 117.8 | 120.8 | 3.2 | 2.2 | 180 | 75 | 0.22 | 0.83 | 0.06 |
| C-2 | 112.2 | 118.0 | 1.8 | 1.2 | 290 | 150 | 0.47 | 1.57 | 0.09 |
| C-3 | 112.1 | 118.8 | 2.4 | 1.6 | 280 | 110 | 0.25 | 1.30 | 0.15 |
| C-4 | 123.3 | 118.8 | 0.9 | 1.2 | 250 | 140 | 8.20 | 1.30 | 0.26 |

Remark:

Formula (1): $Tm < 400 \times d - 250$
wherein Tm means the maximum peak temperature of the DSC endothermic curve, and d means a density.

Formula (2): $MT > 2.2 \times MFR^{-0.84}$
wherein MT means a melt tension at 190° C., and MFR means a melt flow rate.

Formula (3): $FI > 75 \times MFR$
wherein FI means a flow index, and MFR means a melt flow rate.

Formula (4): $W < 80 \times \exp(-100(d - 0.88)) + 0.1$
[under the condition of MFR ± 10 g/10 min], wherein W means a weight of a decane-soluble portion at room temperature.

Formula (4): $W < 80 \times (MFR - 9)^{-0.26} \times \exp(-100(d-0.88)) + 0.1$
[under the condition of MFR > 10 g/10 min], wherein W means a weight of a decane-soluble portion at room temperature.

*[1]the number of unsaturated bond in the ethylene/α-olefin copolymer based on 1,000 carbon atoms.
A-1 to A-3, B-1 to B-3 and C-1 to C-3: Zr type catalyst, gas phase polymerization
A-4, B-4 and C-4: Ti type catalyst, gas phase polymerization

TABLE 2

| | Component A Code No. | Component B Code No. | Mixing ratio A/B (weight ratio) | Density g/cm$^3$ | Melt property of ethylene copolymer composition | | | Physical property of film | | |
|---|---|---|---|---|---|---|---|---|---|---|
| | | | | | MFR g/10 min | MT g | FI s$^{-1}$ | Haze % | Film impact kg · cm/cm | Blocking force g/cm |
| Ex. 1 | A-1 | B-1 | 57/43 | 0.926 | 1.1 | 3.3 | 290 | 10.5 | 5,250 | 0 |
| Ref. Ex. 1 | C-1 | | — | 0.927 | 1.0 | 3.2 | 180 | 10.0 | 2,210 | 0.10 |
| Ex. 2 | A-2 | B-2 | 60/40 | 0.921 | 2.0 | 1.9 | 520 | 10.5 | 5,770 | 0 |
| Ref. Ex. 2 | C-2 | | — | 0.920 | 2.0 | 1.8 | 290 | 9.5 | 3,540 | 0.21 |
| Ex. 3 | A-3 | B-3 | 20/80 | 0.922 | 1.4 | 2.6 | 125 | 7.1 | 2,600 | 0.17 |
| Ref. Ex. 3 | C-3 | | — | 0.922 | 1.5 | 2.4 | 280 | 10.8 | 2,400 | 0.19 |
| Comp. Ex. 1 | A-4 | B-4 | 60/40 | 0.922 | 2.0 | 1.0 | 360 | 26.8 | 3,500 | 5.6 |
| Comp. Ex. 2 | C-4 | | — | 0.922 | 1.9 | 0.9 | 250 | 13.0 | 3,000 | 4.2 |

What is claimed is:

1. An ethylene copolymer composition comprising and ethylene/α-olefin copolymer in an amount of 5 to 95% by weight which is (A-i) a copolymer of ethylene with an α-olefin of 3 to 20 carbon atoms having such properties that (A-ii) the density (d) is in the range of 0.880 to 0.940 g/cm³, (A-iii) the intrinsic viscosity as measured in decahydronaphthalene at 135° C. is in the range of 1.0 to 10.0 dl/g, (A-iv) the temperature Tm (° C.)) at which the endothermic curve of said copolymer measured by a differential scanning calorimeter (DSC) shows the maximum peak and the density (d) satisfy the relation $$Tm < 400 \times d - 250,$$

(A-v) the melt tension (MT) (g)) at 190° C. and the melt flow rate (MFR) satisfy the relation $$MT > 2.2 \times MFR^{-0.84},$$

(A-vi) the flow index (FI (1/sec)) defined by a shear rate which is given when a shear stress of molten copolymer at 190° C. reaches $2.4 \times 10^6$ dyne/cm² and the melt flow rate (MFR) satisfy the relation $$FI > 75 \times MFR, \text{ and}$$

(A-vii) the amount (W (% by weight)) of a decane-soluble portion at room temperature and the density (d) satisfy the relation, $$W < 80 \times exp(-100(d-0.88))+0.1, \text{ and}$$

an ethylene/α-olefin copolymer in an amount of 5 to 95% by weight which is (B-i) a copolymer of ethylene with an α-olefin of 3 to 20 carbon atoms having such properties that (B-ii) the density (d) is in the range of 0.910 to 0.960 g/cm³, (B-iii) the intrinsic viscosity as measured in decahydronaphthalene at 135° C. is in the range of 0.5 to 2.0 dl/g, (B-iv) the temperature Tm (° C.)) at which the endothermic curve of said copolymer measured by a differential scanning calorimeter (DSC) shows the maximum peak and the density (d) satisfy the relation $$Tm < 400 \times d - 250, \text{ and}$$

(B-v) the amount (W (% by weight)) of a decane-soluble portion at room temperature and the density (d) satisfy the relation, in the case of MFR < 10 g/10 min,
$W < 80 \times exp(-100(d-0.88))+0.1$ in the case of MFR > 10 g/10 min,
$W < 80 \times (MFR-9)^{0.26} \times exp(-100(d-0.88))+0.1,$ said ethylene/α-olefin copolymer composition having such properties that (i) the density ratio ([A]/[B]) of the density of said ethylene/α-olefin copolymer to the density of said ethylene/α-olefin copolymer is less than 1, (ii) the intrinsic viscosity ratio ($[\eta_A]/[\eta_B]$) of the intrinsic viscosity of said ethylene/α-olefin copolymer to the intrinsic viscosity of said ethylene/α-olefin copolymer is not less than 1, (iii) the density of said composition is in the range of 0.890 to 0.955 g/cm³, and (iv) the melt flow rate (MFR) of said composition at 190° C. under a load of 2.16 kg is in the range of of 0.1 to g/100 min.

2. The ethylene copolymer composition according to claim 1, wherein (i) the density ratio ([A]/[B]) of the density of said ethylene/α-olefin copolymer to the density of said ethylene/α-olefin copolymer is 0.930 to 0.999.

3. The ethylene copolymer composition according to claim 1 or 2, wherein (ii) the intrinsic viscosity ratio ($[\eta_A]/[\eta_B]$) of the intrinsic viscosity of said ethylene/α-olefin copolymer to the intrinsic viscosity of said ethylene/α-olefin copolymer is 1.05 to 10.

4. The ethylene copolymer composition according to claim 1, wherein the ethylene/α-olefin copolymer (A) and the ethylene/α-olefin copolymer (B) are each obtained by copolymerization of an ethylene and an α-olefin in the presence of a catalyst for olefin polymerization comprising (a) a compound of a transition metal in Group IVB of the periodic table which has a bidentate ligand formed by bonding two groups selected from indenyl or substituted indenyl groups through a lower alkylene group, or a compound of a transition metal in Group IVB of the periodic table which has a ligand having a cyclopentadienyl skeleton, and (b) an organoaluminum oxy-compound.

* * * * *